May 14, 1929.   A. BEURRIER   1,713,366
HYDRAULIC PRIME MOVER
Filed Oct. 1, 1925
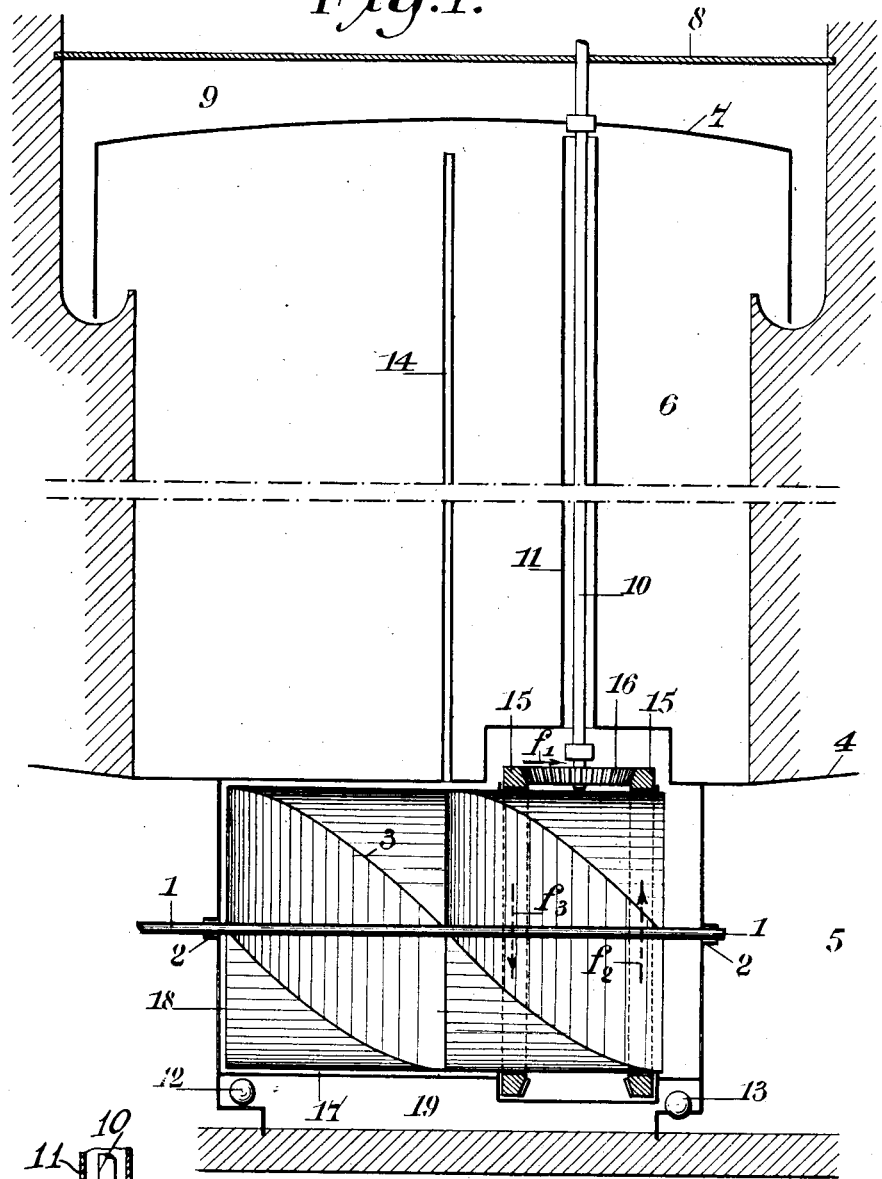
Fig.1.
Fig.2.
Inventor
A. Beurrier
by
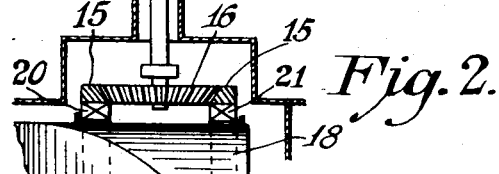
Atty's.

Patented May 14, 1929.

1,713,366

UNITED STATES PATENT OFFICE.

ALEXIS BEURRIER, OF THAIMS PAR COZES, FRANCE.

HYDRAULIC PRIME MOVER.

Application filed October 1, 1925, Serial No. 59,928, and in France October 2, 1924.

My invention relates to a hydraulic prime mover which is chiefly adapted for the utilization of the current of rivers having a small amount of fall, the said device being characterized by the fact that it essentially comprises suitable partitions of helical form disposed within a cylinder whose axis is placed parallel with the current.

The said motor device may operate either by partial or total immersion in the water. For total immersion, the water level within the motor is maintained at a given height by means of a certain quantity of air which is contained in the upper part of the motor constituting a compression chamber.

For use as a tidal motor, I provide special means for the formation and maintenance of an air cushion within the motor, and also for the transmission of the movement in either direction at will.

The appended drawing shows by way of example an embodiment of the said invention.

Fig. 1 is a vertical section through the device of my invention.

Fig. 2 is a fragmentary view partly in section showing the reversible connection between the power shaft and the ring gears.

The hydraulic motor according to my said invention comprises a single element having the form of a horizontal cylinder 18 which is for instance partially immersed, and whose shaft 1 is maintained by two ball bearings 2. These bearings may also comprise two ordinary thrust bearings to resist the thrust created by the current on the helicoidal parts of cylinder 18.

The said cylinder is divided into a certain number of sectors, for example four sectors in the 90 degree position, by means of the helical partitions 3. The said partitions represent the greatly spread out threads of a screw whose center line is the axis of the cylinder and the outer limit the cylinder. Each of the said helical partitions represents one-half the pitch value, so that when the inclination of the ramp is 45 degrees, the minimum length of the cylinder 18 will be equal to one-half its circumference.

In order to increase the velocity and the pressure of the water on the said helical surfaces 3, on the upstream side and adjacent the said power cylinder I dispose a funnel-shaped conduit 4 with very smooth walls which coincide exactly with the inlet end of the cylinder 18.

The said conduit 4 has the shape of one-half of a truncated cone; the sides of which form a water channel, and the apex of the channel lies upon the same horizontal plane as the axis of the cylinder, or is somewhat below it, so that if the water supply should exceed the requirements of the prime mover, the surplus will be discharged into the river without passing through the same.

The operation is as follows:

The water enters the said cylinder and exercises a pressure upon the walls of the helical elements, thus rotating the motor device. Since the liquid streams remain rectilinear during this motion, the helical surfaces will move backward tangentially in order to give passage to the water as it flows through. The motor device will thus assume a standard speed and will be automatically regulated.

In fact, if the motor operates at no load, the water will flow at a greater speed, since the helical elements will offer but little resistance. If the resistance increases, the motor will slow down; the helical part will move back more slowly, so that the water accumulates and exercises a great pressure on the helical part until the resistance is overcome; when the resistance diminishes, the current flows more rapidly and the water level now falls. Should the resistance increase, the power also increases, and if the resistance diminishes, the power diminishes, so that the regular functioning is automatically assured.

The said prime mover may be entirely immersed. In this event, I prefer to maintain in the cylinder 18 a certain amount of air which prevents the water level from exceeding a given point; for this purpose I surround the cylinder 18 with a watertight casing 17 which provides for the intake of the water only in the lower segment of the horizontal cylinder.

The liquid exercises pressure upon the face of the said helical partitions with the full power due to the water head. This pressure is constant and continuous in the lower segment of the cylinder, and even though the cylinder be entirely immersed below a waterfall, the water cannot rise in the cylinder above the stated horizontal limit, since the air cushion in the upper segment of the cylinder will form an insurmountable obstacle.

The motor is disposed in the channel 5 which is provided at the lower part of the dam; above it is the compression chamber 6 which is closed at the top by the plate 7, with a tight joint. The actuated machines may be installed upon the flooring 8 which forms the top of the intermediate chamber 9.

The power is transmitted by the shaft 10 which is placed in the watertight tube 11 and is mounted at the top in a bearing.

The air pressure required to counterbalance the external pressure of the water and to prevent the water level within the cylinder 18 from rising above a stated point is obtained in the following manner. At the lower part of the casing, or if necessary at any other point, there are mounted two check valves 12 and 13 connecting the outer part with a chamber 19 surrounding the casing 17 of the cylinder 18, said valves acting in contrary directions. At the rising tide, the water coming from the outside—at the left of the figure—will pass through the valve 12 which is open, while the valve 13 is closed. The water thus entering will rise within the casing and will expel the air, compressed therein, through the pipe 14, thus preventing the surface of the water in the cylinder from rising above the stated level. At the falling tide, an analogous action takes place, with the valve 13 open and the valve 12 closed.

To enable the use of the power of the motor in either direction and without an excessive amount of mechanism, I may employ the following arrangement.

The motor comprises two driving bevel wheels 15 engaging a common wheel bevel 16 which is keyed to the driving shaft 10. The wheels 15 are not rigidly mounted on the cylinder 18, but are mounted thereon by means of ratchet gear 15, diagrammatically shown in Fig. 2 in such manner that when one wheel is loose the other will be engaged, e. g. one wheel is loose in a given direction of motion (for rising tide) and the other is loose in the other direction (falling tide). The wheel 16 will thus turn in a given direction at all times, or according to the arrow $f_1$, it being driven either by the first wheel 15 turning according to $f_3$ or by the second wheel 15 turning according to $f_2$, irrespectively of the direction of rotation of the motor so that the shaft 10 will always rotate in the same direction.

It should be noted that the aforesaid drive is applicable not only to the above-mentioned hydraulic prime movers, but also to all devices, motive or actuated, which are capable of rotating in both directions.

I claim:

1. In a hydraulic plant, a cylinder casing, a cylinder rotatably mounted therein and having its axis parallel to the current flow, helicoidal partitions integral with the hub and walls of the cylinder, said casing having fluid openings at the lower part of each end.

2. In a hydraulic plant, a cylinder casing, a cylinder rotatably mounted therein and having its axis parallel to the current flow, helicoidal partitions integral with the hub and walls of the cylinder, said casing having fluid openings at the lower part of each end, a compression bell communicating with said casing, a fluid-tight jacket surrounding said casing, and a conduit establishing communication between the jacket and the bell.

3. In a hydraulic plant, a cylinder casing, a cylinder rotatably mounted therein and having its axis parallel to the current flow, helicoidal partitions integral with the hub and walls of the cylinder, said casing having fluid openings at the lower part of each end, a compression bell communicating with said casing, a fluid-tight jacket surrounding said casing, a conduit establishing communication between the jacket and the bell, and check valves for permitting flow of water into said jacket.

In testimony whereof I have signed my name to this specification.

ALEXIS BEURRIER.